United States Patent
Nishiguchi et al.

(12)
(10) Patent No.: US 6,492,027 B2
(45) Date of Patent: Dec. 10, 2002

(54) CATIONIC RESIN COMPOSITION

(75) Inventors: Shigeo Nishiguchi, Hiratsuka (JP); Koji Kamikado, Yokohama (JP); Tadayoshi Hiraki, Odawara (JP); Akira Tominaga, Chigasaki (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 0 days.

(21) Appl. No.: 09/867,623

(22) Filed: May 31, 2001

(65) Prior Publication Data

US 2002/0010284 A1 Jan. 24, 2002

(30) Foreign Application Priority Data

May 31, 2000 (JP) .................................. 2000-162744

(51) Int. Cl.$^7$ ................................................ B32B 27/38
(52) U.S. Cl. .................. 428/418; 204/505; 523/403; 523/404; 523/410; 523/423; 523/424; 525/526; 525/528; 525/533
(58) Field of Search ................. 523/403, 404, 523/410, 423, 424; 525/526, 528, 535; 428/418; 204/505

(56) References Cited

U.S. PATENT DOCUMENTS

| 3,203,920 A | | 8/1965 | Nikles et al. |
| 4,396,649 A | | 8/1983 | Bailey et al. |
| 4,420,574 A | * | 12/1983 | Moriarity et al. ............ 523/404 |
| 4,892,897 A | * | 1/1990 | Redman ..................... 523/404 |
| 5,095,051 A | | 3/1992 | Chung et al. |
| 5,298,148 A | | 3/1994 | Yasuoka et al. |

OTHER PUBLICATIONS

Chemical Abstracts, Print Out of Registry File Citation, 2001.*

* cited by examiner

Primary Examiner—Robert Dawson
Assistant Examiner—D. Aylward
(74) Attorney, Agent, or Firm—Wenderoth, Lind & Ponack, L.L.P.

(57) ABSTRACT

The present invention provides a cationic resin composition capable of forming a cationically electrodepositable coating film which is excellent in corrosion resistance, an aptitude for the cationic electrodepositable coating of a rust preventive steel plate and in adhesion to substrate, which cationic resin composition is characterized by comprising the following components:

(A) an amino group-containing epoxy resin which is prepared by adding an amino group-containing compound to an epoxy resin having an epoxy equivalent of 400 to 3000, (B) a polyol-modified amino group-containing epoxy resin which is prepared by making an epoxy resin having an epoxy equivalent of 180 to 2500 react with an amino group-containing compound and with a polyol compound obtained by adding caprolactone to a compound having plural active hydrogen groups, and (C) a blocked polyisocyanate curing agent, component (A) being 40 to 70% by weight, component (B) being 4 to 40% by weight, and component (C) being 10 to 40% by weight, based on the total solid contents of (A), (B) and (C).

23 Claims, No Drawings

CATIONIC RESIN COMPOSITION

The present invention relates to a cationic resin composition, more specifically to a cationic resin composition capable of forming a cured coating film which is excellent in both corrosion resistance and an aptitude for the cationic electrodepositable coating of a rust preventive steel plate.

A cationic resin composition is used mainly as a cationic electrodepositable coating composition for wide-ranged uses including an undercoating composition for car bodies, and those having various characteristics have so far been developed. Proposed as a conventional cationic resin composition is, for example, a coating composition having excellent corrosion resistance and improved in an electrodepositable coating aptitude and an adhesive property toward a rust preventive steel plate, in which used as a vehicle component is a modified epoxy resin obtained by internally plasticizing an epoxy resin having an amino group and/or a quaternary ammonium salt group as a hydrophilic group with a plasticizer such as polyamide, polyester and polyether and blended is a rust preventive pigment, for example, a lead compound or a chromium compound such as lead chromate, basic lead silicate and strontium chromate. In recent years, however, hazardous compounds such as lead compounds and chromium compounds are restricted in use thereof from a viewpoint of pollution problems, and techniques which can improve a corrosion resistance of the coating film without blending such hazardous compounds are expected to be developed.

On the other hand, an epoxy resin which is internally plasticized with a plasticizer such as polyamide, polyester and polyether tends to reduce a corrosion resistance of the coating film, and therefore it is considered to use an epoxy resin containing no plasticizing modifier to thereby elevate the corrosion resistance. However, this provides the problem that the electrodepositable coating aptitude against a rust preventive steel plate is reduced. In order to solve such problems, it is proposed that added as a plasticizer for an epoxy resin are, for example, polyol resins such as polyesterpolyols, polyetherpolyols, polyurethanepolyols and acrylpolyols; and polymers including polyolefins such as polybutadiene and polyethylene. Involved therein, however, is the problem that these materials not only do not have a sufficiently high compatibility with epoxy resins and are not effective so much for elevating a rust preventive steel plate aptitude but also reduce a corrosion resistance of the coating film by adding in a large amount.

A main object of the present invention is to provide a cationic resin composition useful in particular as a cationic electrodepositable coating, comprising an epoxy resin as a base material and capable of forming a coating film which is excellent both in a corrosion resistance and a rust preventive steel plate aptitude without using hazardous compounds such as lead compounds and chromium compounds.

Intensive researches repeated by the present inventors have resulted in finding that the object described above can be achieved by combining, as a vehicle component in a cationic resin composition, a certain kind of amino group-containing epoxy resin with a specific polyol-modified amino group-containing epoxy resin and a blocked polyisocyanate curing agent.

Thus, the present invention provides a cationic resin composition comprising the following components:

(A) an amino group-containing epoxy resin which is prepared by adding an amino group-containing compound (a-2) to an epoxy resin (a-1) having an epoxy equivalent of 400 to 3000, (B) a polyol-modified amino group-containing epoxy resin which is prepared by making an epoxy resin (b-1) having an epoxy equivalent of 180 to 2500 react with an amino group-containing compound (b-2) and with a polyol compound (b-3) obtained by adding caprolactone to a compound having plural active hydrogen groups, and (C) a blocked polyisocyanate curing agent, component (A) being 40 to 70% by weight, component (B) being 4 to 40% by weight, and component (C) being 10 to 40% by weight, based on the total solid contents of (A), (B) and (C).

The cationic resin composition of the present invention shall be explained below in further details.

Amino Group-containing Epoxy Resin (A)

Amino group-containing epoxy resin which is used as component (A) in the cationic resin composition of the present invention is prepared by adding an amino group-containing compound (a-2) to an epoxy resin (a-1). Said epoxy resin (a-1) can have an epoxy equivalent falling in a range of 400 to 3000, preferably 450 to 2500, and more desirably 500 to 2200. Further, it has suitably a number average molecular weight falling in a range of usually 500 to 5000, particularly 600 to 4500, and more particularly 800 to 4000. An epoxy resin obtained by the reaction of a polyphenol compound with epihalohydrin, for example epichlorohydrin, is particularly suited as an epoxy resin (a-1) from the viewpoint of corrosion resistance of coating film.

Polyphenol compounds which can be used for producing the above epoxy resin include, for example, bis(4-hydroxyphenyl)-2,2-propane (bisphenol A), 4,4-dihydroxybenzophenone, bis(4-hydroxyphenyl)methane (bisphenol F), bis(4-hydroxyphenyl)-1,1-ethane, bis(4-hydroxyphenyl)-1,1-isobutane, bis(4-hydroxy-tert-butylphenyl)-2,2-propane, bis(2-hydroxynaphthyl)methane, tetra(4-hydroxyphenyl)-1,1,2,2-ethane, 4,4-dihydroxydiphenylsulfone (bisphenol S), phenol novolak and cresol novolak.

Particularly suited as an epoxy resin obtained by the reaction of a polyphenol compound with epichlorohydrin is a compound which is derived from bisphenol A, and which is represented by the following formula:

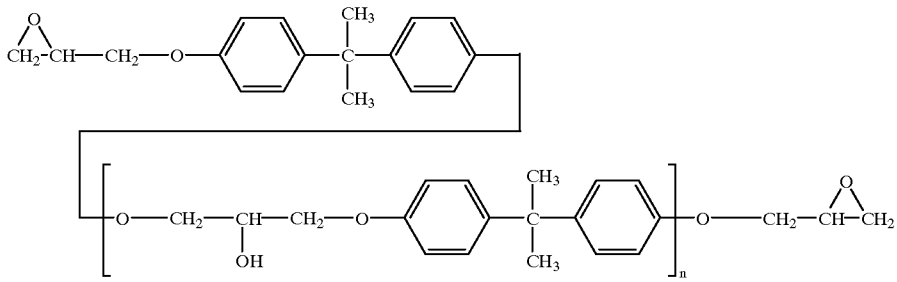

wherein n is 1 to 10.

Commercially available products of such epoxy resin include, for example, products which are marketed from Japan Epoxy Resin Co., Ltd. in the trade names of Epikote 828EL, ditto 1002, ditto 1004 and ditto 1007.

For the amino group-containing compound (a-2) as a cationic property-providing component with which to introduce an amino group into the above-mentioned epoxy resin (a-1) and to thereby cationize said epoxy resin, there are suitably used amine compounds having at least one active hydrogen which performs an addition reaction with an epoxy group of epoxy resin (a-1), for instance amine compounds which have at least one primary or secondary amino group in molecule. Concrete examples of such compounds include mono- or di-alkylamines such as monomethylamine, dimethylamine, monoethylamine, diethylamine, monoisopropylamine, diisopropylamine, triisopropylamine, monobutylamine and dibutylamine; alkanolamines such as monoethanolamine, diethanolamine, mono(2-hydroxypropyl)amine, di(2-hydroxypropyl)amine, tri(2-hydroxypropyl)amine, monomethylaminoethanol and monoethylaminoethanol; alkylenepolyamines such as ethylenediamine, propylenediamine, butylenediamine, hexamethylenediamine, tetraethylenepentamine, pentaethylenehexamine, diethylaminopropylamine, diethyelenetriamine and triethylenetetramine, and ketimine-reduced compounds of these polyamines; alkyleneimines such as ethyleneimine and propyleneimine; and cyclic amines such as piperazine, morpholine and pyrazine.

The above-mentioned addition reaction between epoxy resin (a-1) and amino group-containing compound (a-2) may be conducted by a known method. For instance, epoxy resin (a-1) and amino group-containing compound (a-2) are allowed to react with each other in an organic solvent like hydrocarbon type solvent such as heptane, toluene, xylene, octane and mineral spirits; ester type solvent such as ethyl acetate, n-butyl acetate, isobutyl acetate, ethyleneglycol monomethylether acetate and ethyleneglycol monobutylether acetate; ketone type solvent such as methyl ethyl ketone, methyl isobutyl ketone, diisobutyl ketone and cyclohexane; alcohols such as methanol, ethanol, iso-propanol, n-butanol, sec-butanol and isobutanol; and ether type solvent such as n-butylether, dioxane, ethyleneglycol monomethylether and ethyleneglycol monoethylether, at a temperature of about 80 to about 130° C. The proportion of epoxy resin (a-1) to amino group-containing compound (a-2) used in the addition reaction is not strictly restricted, but can suitably be changed according to the species of starting materials used and special properties which products are desired to have. Usually, however, the weight ratio of (a-1)/(a-2) is preferably within a range of 90/10 to 60/40, in particular 85/15 to 70/30.

Thus obtained amino group-containing epoxy resin (A) can have an amine value within a range of 30 to 100, preferably 40 to 80.

Polyol-modified Amino Group-containing Eepoxy Resin (B)

Polyol-modified amino group-containing epoxy resin which is used as component (B) in the cationic resin composition of the present invention is prepared by making an epoxy resin (b-1) react with an amino group-containing compound (b-2) and with a polyol compound (b-3) obtained by adding caprolactone to a compound having plural active hydrogen groups. The above-mentioned epoxy resin (b-1) can have an epoxy equivalent within a range of 180 to 2500, preferably 200 to 2000, much desirably 400 to 1500, and suitably has a number average molecular weight within a range of at least 200, in particular 400 to 4000, especially 800 to 2000.

Like the above-mentioned epoxy resin, also epoxy resin (b-1) is preferably obtained by a reaction between a polyphenol compound and epichlorohydrin, and, thus, may be appropriately chosen from those which are recited above with respect to epoxy resin (a-1).

For amino group-containing compound (b-2) which is used for the purpose of introducing amino group, as a cationizable group, into the above-mentioned epoxy resin (b-1), there may also be employed those which are recited above as amino group-containing compound (a-2) with which to introduce amino group into epoxy resin (a-1).

In the present invention, furthermore, a polyol compound (b-3) is made to react for the purpose of internally plasticizing (modifying) the epoxy resin (b-1). For this polyol compound (b-3), there are employed those which are produced by adding caprolactone to a compound (hereinafter referred to as "active hydrogen-compound") having plural active hydrogen groups.

An active hydrogen group means an atomic group containing at least one active hydrogen and includes, for example, an alcoholic hydroxyl group, a primary amino group and a secondary amino group. The compound having plural groups of such active hydrogen group in a molecule, i.e., active hydrogen-compound, includes, for example:

(i) low molecular weight polyols,
(ii) linear or branched polyetherpolyols,
(iii) linear or branched polyesterpolyols,
(iv) amine compounds having a primary amino group and/or a secondary amino group or hydroxylamine compounds having a primary amino group and/or a secondary amino group in combination with a hydroxyl group.

These active hydrogen group-containing compounds can have a number average molecular weight falling in a range of usually 62 to 5,000, preferably 62 to 4,000 and more preferably 62 to 1,500. The active hydrogen-compound is suitably a compound having at least two groups and less than 30 groups, particularly 2 to 10 groups of the active hydrogen groups per molecule on the average.

The low molecular weight polyol (i) described above is a compound having at least two alcoholic hydroxyl groups in a molecule, and to be specific, it includes, for example, diols such as ethylene glycol, propylene glycol, 1,3-butylene glycol 1,4-butanediol, 1,6-hexanediol, diethylene glycol, dipropylene glycol, cyclohexane-1,4-dimethylol, neopentyl glycol, triethylene glycol and hydrogenated bisphenol A; triols such as glycerin, trimethylolethane and trimethylolpropane; tetrols such as pentaerythritol and α-methylglycoside; hexols such as sorbitol and dipentaerythritol; and octols such as sucrose.

The linear or branched polyetherpolyol (ii) described above can have a number average molecular weight falling in a range of usually 62 to 10,000, preferably 62 to 2,000, and to be specific, it includes, for example, polyethylene glycol, polypropylene glycol, polytetramethylene glycol, poly(ethylene•propylene) glycol, bisphenol A ethylene glycol ether and bisphenol A propylene glycol ether which are produced by ring-opening reaction of alkylene oxides (e. g., ethylene oxide, propylene oxide, butylene oxide and tetrahydrofuran).

The linear or branched polyesterpolyol (iii) described above can have a number average molecular weight falling in a range of usually 200 to 10,000, preferably 200 to 3,000, and to be specific, it includes, for example, compounds obtained by polycondensation reaction of organic dicarboxylic acids or anhydrides thereof with organic diols on the condition of organic diol excess. The organic dicarboxylic acid used in this case includes aliphatic, alicyclic or aromatic organic dicarboxylic acids having 2 to 44 carbon atoms, particularly 4 to 36 carbon atoms, for example, succinic acid, adipic acid, azelaic acid, sebacic acid, maleic acid, fumaric acid, glutaric acid, hexachloroheptane-dicarboxylic acid, cyclohexanedicarboxylic acid, o-phthalic acid, isophthalic acid, terephthalic acid, tetrahydrophthalic acid and tetrachlorophthalic acid. Further, in addition to these carboxylic acids, capable of being used in combination in small amounts are anhydrides of polycarboxylic acids having 3 or more carboxyl groups and adducts of unsaturated fatty acids.

The organic diol component includes, for example, alkylene glycols such as ethylene glycol, propylene glycol, butylene glycol, 1,4-butanediol, 1,6-hexanediol, and neopentyl glycol, and dimethylolcyclohexane. They may be used, if necessary, in combination with a small amount of polyol such as trimethylolpropane, glycerin and pentaerythritol.

The preceding amine compound having a primary amino group and/or a secondary amino group or amine compound (iv) having a primary amino group and/or a secondary amino group in combination with a hydroxyl group includes, for example, alkylamines such as butylenediamine, hexamethylenediamine, tetraethylene-pentamine and pentaethylenehexamine; alkanolamines such as monoethanolamine, diethanolamine, triethanolamine, mono(2-hydroxypropyl)amine and di(2-hydroxypropyl)amine; alicyclic polyamines such as 1,3-bisaminomethylcyclohexane and isophoronediamine; aromatic polyamines such as xylylenediamine, metaxylenediamine, diaminodiphenylmethane and phenylenediamine; alkylenepolyamines such as ethylenediamine, propylenediamine, diethylene-triamine and triethylenetetramine; and other amine compounds such as polyamides and polyamideamines which are derived from piperizine and these polyamines, amine adducts with epoxy compounds, ketimines and aldimines.

Among the compounds having plural active hydrogen groups described above, suited are the compounds of (i), (ii), (iii) and (iv), particularly compounds selected from the group consisting of ethylene glycol, propylene glycol, 1,4-butanediol, 1,6-hexanediol, diethylene glycol, hydrogenated bisphenol A, glycerin, trimethylolethane, trimethylolpropane, pentaerythritol dipentaecrythritol, polyethylene glycol polypropylene glycol, polytetramethylene glycol, poly(ethylene•propylene) glycol, bisphenol A ethylene glycol ether, bisphenol A propylene glycol ether, butylenediamine, hexamethylenediamine, monoethanolamine, diethanolamine, triethanol-amine, isophoronediamine, ethylenediamine, propylene-diamine, diethylene-triamine and triethylenetetramine.

On the other hand, caprolactone which can be added to these active hydrogen-compounds include γ-caprolactone, ε-caprolactone and δ-caprolactone, among which ε-caprolactone is particularly suited.

The addition reaction between the above active hydrogen-compounds and caprolactone can be carried out by conventionally known methods. To be specific, it can be carried out, for example, by heating an active hydrogen-compound and caprolactone at a temperature of about 100 to about 250° C. for about one to about 15 hours in the presence of a catalyst including titanium compounds such as tetrabutoxytitanium and tetrapropoxytitanium, organic tin compounds such as tin octylate, dibutyltin oxide and dibutyltin laurate, and metal compounds such as stannous chloride.

In general, the catalyst described above can be used in an amount of 0.5 to 1,000 ppm based on the total amount of active hydrogen-compound and caprolactone. Caprolactone can be used in an amount falling in a range of usually 1 to 30 moles, preferably 1 to 20 moles and more desirably 1 to 15 moles per equivalent of active hydrogen group (that is, per active hydrogen) of active hydrogen-compound.

The polyol compound (b-3) thus obtained has together a high plasticizing performance based on the active hydrogen-compound, a high compatibility with an epoxy resin based on (poly)caprolactone and a high reactivity attributable to a terminal hydroxyl group, and therefore is very useful as an internal plasticizer for an epoxy resin for a coating composition.

The polyol compound (b-3) can contain caprolactone-originated units in a proportion falling in a range of usually 20 to 95% by weight, preferably 25 to 90% by weight, and can have a number average molecular weight falling in a range of usually 300 to 10,000, preferably 400 to 5,000.

The polyol-modified amino group-containing epoxy resin used as component (B) in the resin composition of the present invention can be produced by subjecting the epoxy resin (b-1) described above, by a known method, to an addition reaction with the amino group-containing compound (b-2) and the polyol compound (b-3) having a terminal hydroxyl group originating in caprolactone. The reaction of the polyol compound (b-3) and the amino group-containing compound (b-2) with the epoxy resin (b-1) can be carried out in an optional order. In general, however, the polyol compound (b-3) and the amino group-containing compound (b-2) are suitably made to react with the epoxy resin (b-1) at the same time. A single terminal of the polyol compound (b-2) is preferably added to the skeleton of the epoxy resin (b-1).

The above-mentioned addition reaction can be carried out usually in a suitable solvent at a temperature of about 90 to about 170° C., preferably about 100 to about 150° C. for one to 5 hours, preferably 2 to 4 hours. Said solvent includes, for example, hydrocarbons such as toluene, xylene and n-hexane; esters such as methyl acetate, ethyl acetate and butyl acetate; ketones such as acetone, methyl ethyl ketone, methyl isobutyl ketone and methyl amyl ketone; amides such as dimethylformamide and dimethylacetamide; alcohols such as methanol, ethanol n-propanol and iso-propanol; and mixtures thereof.

The proportion of reaction components in the addition reaction described above is not strictly restricted, and can suitably be changed according to uses of the resin composition. The ratio of epoxy resin (b-1), the amino group-containing compound (b-2) and the polyol compound (b-3) falls suitably in the following ranges based on the total solid matter weight of the three components described above:

Epoxy resin (b-1):
  Usually 60 to 90% by weight, preferably 62 to 85% by weight and more desirably 62 to 80% by weight
Amino group-containing compound (b-2):
  Usually 5 to 25% by weight, preferably 6 to 19% by weight and more preferably 6 to 18% by weight
Polyol compound (b-3):
  Usually 5 to 30% by weight, preferably 5 to 20% by weight and more preferably 5 to 18% by weight Blocked Polyisocyanate Curing Agent (C)

The blocked polyisocyanate curing agent which is used as component (C) in the cationic resin composition of the present invention is an addition reaction product of a polyisocyanate compound with an isocyanate blocking agent in almost stoichiometric amounts. The polyisocyanate compound used includes, for example, aromatic, aliphatic or alicyclic polyisocyanate compounds such as tolylenediisocyanate, xylilenediisocyanate, phenylenediisocyanate, bis(isocyanatemethyl)cyclohexane, tetramethylenediisocyanate, hexamethylenediisocyanate, methylenediisocyanate and isophoronediisocyanate, and terminal isocyanate group-containing compounds obtained by reacting excess amounts of these polyisocyanate compounds with low molecular active hydrogen-containing compounds such as ethylene glycol, propylene glycol, trimethylolpropane, hexanetriol and castor oil.

On the other hand, the isocyanate blocking agents described above are added to, and block, isocyanate groups of the polyisocyanate compounds, and the blocked polyisocyanate compounds formed by the addition are stable at a room temperature. However, when they are heated at a baking temperature (usually, about 100 to about 200° C.) of the coating film, the blocking agent is preferably dissociated to regenerate free isocyanate groups. Examples of blocking agent satisfying such requisite include lactam compounds such as ε-caprolactam and γ-butyrolactam; oxime compounds such as methyl ethyl ketoxime and cyclohexanone-oxime; phenol compounds such as phenol, p-t-butylphenol and cresol; aliphatic alcohols such as n-butanol and 2-ethylhexanol; aromatic alkylalcohols such as phenyl-carbinol and methylphenylcarbinol; and ether alcohol base compounds such as ethylene glycol monobutyl ether.

Cationic Resin Composition

The cationic resin composition provided by the present invention comprises amino group-containing epoxy resin (A), polyolmodified amino group-containing epoxy resin (B) and blocked polyisocyanate curing agent (C) as mentioned above.

The proportion of the above-mentioned components (A), (B) and (C) in the resin composition of the present invention is as follows, based on the total solid matter weight of these components:

Component (A): 40 to 70% by weight, preferably 43 to 67% by weight, more desirably 45 to 65% by weight;
Component (B): 5 to 40% by weight, preferably 7 to 37% by weight, more desirably 8 to 35% by weight;
Component (C): 10 to 40% by weight, preferably 15 to 40% by weight, more desirably 17 to 35% by weight.

The cationic resin composition of the present invention can be prepared, for example, by sufficiently mixing amino group-containing epoxy resin (A), polyol-modified amino group-containing epoxy resin (B) and blocked polyisocyanate curing agent (C), and then neutralizing the resultant mixture, usually in an aqueous medium, with acidic neutralizer such as formic acid, acetic acid, lactic acid, propionic acid, citric acid, malic acid and sulfamic acid by which to reduce the above-mentioned components water-soluble or water-dispersible. Thus, there are obtained a resin composition suitable as an emulsion for cationic electrodepositable coating.

As a neutralizer, acetic acid, formic acid or a mixture thereof is particularly suited, and the use of these acids elevates a finishing property, a throwing property and a low temperature-curing property of the coating composition formed as well as the stability of paint.

When used as a coating composition, the resin composition of the present invention may contain a bismuth compound as a rust preventive. The kind of the bismuth compound to be blended is not specifically restricted, and includes, for example, inorganic bismuth compounds such as bismuth oxide, bismuth hydroxide, basic bismuth carbonate, bismuth nitrate and bismuth silicate. Among them, bismuth hydroxide is particularly preferred.

Also usable as the above-mentioned bismuth compound are organic acid bismuth salts which are produced by a reaction between two or more organic acids and a bismuth compounds described above, and in which at least one of said organic acids is aliphatic hydroxycarboxylic acid. The organic acids which can be used for producing the above organic acid bismuth salts include, for example, glycolic acid, glyceric acid, lactic acid, dimethylolpropionic acid, dimethylolbutyric acid, dimethylolvaleric acid, tartaric acid, malic acid, hydroxymalonic acid, dihydroxysuccinic acid, trihydroxysuccinic acid, methylmalonic acid, benzoic acid and citric acid.

The inorganic bismuth compounds and the organic acid bismuth salts described above each can be used alone or may be used in combination of two or more kinds thereof.

The content of these bismuth compounds in the resin composition of the present invention is not strictly restricted, and can be changed over a wide range according to performances required of the resin composition. Usually, it falls suitably in a range of 0.01 to 10% by weight, preferably 0.05 to 5% by weight based on the resinous solid contents in the resin composition of the present invention.

Further, the cationic resin composition of the present invention can contain, if necessary, a tin compound as a curing catalyst. Said tin compound includes, for example, organic tin compounds such as dibutyltin oxide and dioctyl-tin oxide; and aliphatic or aromatic carboxylic acid salts of dialkyltin such as dibutyltin dilaurate, dioctyltin dilaurate, dibutyltin diacetate, dioctyltin benzoateoxy, dibutyltin benzoateoxy, dioctyltin dibenzoate and dibutyltin dibenzoate. Among them, dialkyltin aromatic carboxylic acid salts are suitable from a viewpoint of a low temperature curability.

The content of these tin compounds in the resin composition of the present invention is not strictly restricted, and can be changed over a wide range according to performances required of the resin composition. Usually, the tin content falls suitably in a range of 0.01 to 8 parts by weight, preferably 0.05 to 5 parts by weight per 100 parts by weight of the resinous solid contents in the coating composition.

Further, if necessary, the cationic resin composition of the present invention can contain, blended therein, coating material additives such as a color pigment, an extender pigment, a rust preventive pigment, an organic solvent, a pigment dispersant and a surface-controlling agent.

The cationic resin composition of the present invention can be applied on the surface of desired substrate by cationically electrodepositable coating, In general, electrodepositable coating can be carried out on the condition of a loaded voltage of 100 to 400 V in an electrodeposition bath which is controlled usually to a bath temperature of about 15 to about 35° C., and which comprises the coating composition of the present invention diluted with deionized water so that the solid matter concentration becomes about 5 to about 40% by weight, preferably 15 to 25% by weight, and controlled to a pH falling in a range of 5.5 to 9.

A film thickness of an electrodeposited coating film which is formed using the resin composition of the present invention is not specifically restricted, and falls preferably in a range of usually 10 to 40 µm, particularly 15 to 35 µm in terms of a cured coating film. A baking temperature of the coating film is suitably a temperature falling in a range of usually about 120 to about 200° C., preferably about 140 to about 180° C. on the surface of substrate, and the baking time is 5 to 60 minutes, preferably 10 to 30 minutes.

The cationic resin composition of the present invention is suitably used as a cationically electrodepositable coating composition, which use is however not restrictive. The cationic resin composition of the present invention can also be used as a solvent type coating material for a corrosion resistant primer of a steel plate for coating by a method such as electrostatic coating and roll coating.

Further, the resin composition of the present invention can be used as a two-liquid type room temperature-drying coating composition or as an adhesive using, as a cross-linking agent, a polyisocyanate compound and a melamine resin in place of blocked polyisocyanate curing agent.

The cationic resin composition of the present invention forms a cured coating film which is excellent in corrosion resistance, an electrodepositable coating aptitude against a corrosion-resistant steel plate and an adhesive property to a base material, and is useful as an undercoating material for car bodies, car parts and construction and building fields.

The present invention is more specifically explained below with reference to Examples although the present invention is not restricted to Examples. "Parts" and "%" show "parts by weight" and "% by weight" respectively.

Production Example 1: Amino Group Containing Epoxy Resin

There were made to react 1010 g of Epikote 828EL (trade name of an epoxy resin having an epoxy equivalent of 190 and a molecular weight of 350, marketed by Japan Epoxy Resin Co.), 390 g of bisphenol A and 0.2 g of dimethylbenzylamine at 130° C. until the epoxy equivalent became 800. Then, 160 g of diethanolamine and 65 g of a ketiminized diethylenetriamine were added, and allowed to react at 120° C. for 4 hours. There was added 400 g of butyl cellosolve, and, thus, there was obtained resin No. 1 having an amine value of 67 and a resin solid content of 80%.

Production Example 2: Polyol-modified, Amino Group Containing Epoxy Resin

To 400 g of PP-400 (trade name of polypropylene glycol having a molecular weight of 400, marketed by Sanyo Chemical Industrial Ltd.), 300 g of ε-caprolactone was added, and the temperature was elevated up to 130° C. Then, 0.01 g of tetrabutoxytitanium was added, and the temperature was elevated to 170° C. Sampling was carried out with the passage of time while maintaining this temperature to trace the amount of unreacted ε-caprolactone by measurement of an infrared absorption spectrum, and the solution was cooled at a point of time when the reaction rate reached 98% or more to give a modifying agent 1.

Next, another flask was charged with 1010 g of Epikote 828EL (trade name of an epoxy resin having an epoxy equivalent of 190 and a molecular weight of 350, manufactured by Japan Epoxy Resin Co.), 390 g of bisphenol A and 0.2 g of dimethylbenzylamine, which were made to react at 130° C. until the epoxy equivalent became 800. Then, there were added 200 g of the modifying agent 1,140 g of diethanolamine and 65 g of a ketiminized diethylenetriamine, and the resultant mixture was allowed to react at 120° C. for 4 hours, and then 400 g of butyl cellosolve was added, and, thus, there was obtained a polyol-modified amino group-containing epoxy resin No. 2 having an amine value of 31 and a resin solid content of 90%.

Production Example 3: Polyol-modified Amino Group-containing Epoxy Resin

The same operation as Production Example 2 was conducted except that modifying agent 1 was replaced with 1561 g of PLACCEL 208 (tradename of polycaprolactone polyol compound manufactured by Daicel Kagaku K.K.), and, thus, there was obtained a polyol-modified amino group-containing epoxy resin No. 3 having a resin solid content of 90%.

Production Example 4: Blocked Polyisocyanate Curing Agent

There was added dropwise 174 g of methylethyl ketoxime slowly to 168 g of hexamethylene isocyanate and 38 g of methyl isobutyl ketone at 50° C., and, thus, there was obtained a blocked polyisocyanate curing agent "a" having a solid content of 90%.

Production Example 5: Blocked Polyisocyanate Curing Agent

To 270 g of M-200 (trade name of crude MDI manufactured by Mitsui Chemicals Inc.), there was added 46 g of methyl isobutyl ketone, and the temperature was elevated to 70° C. There was slowly added 280 g of diethylene glycol monoethyl ether, and the temperature was elevated to 90° C. Sampling was carried out with the passage of time while maintaining this temperature to confirm by measurement of an infrared absorption spectrum that absorption of unreacted isocyanate disappeared, whereby a blocked polyisocyanate curing agent "b" having a solid content of 90% was obtained.

Production Example 6: Emulsion for Cationic Electrodepositable Coating Composition There were blended and stirred uniformly 62.5 parts of the amino group-containing epoxy resin No. 1 obtained in Production Example 1, 22.2 parts of the polyol-modified amino group-containing epoxy resin No. 2 obtained in Production Example 2, 33.3 parts of the blocked-polyisocyanate curing agent "a" (hexamethylene isocyanate blocked with methylethyl ketoxime) obtained in Production Example 4, 2.5 parts of LSN-105 (tradename of dibutyltin dibenzoate having a solid content of 40%, manufactured by Sankyo Yuki Gosei Sha) and 8.2 parts of 10% formic acid. Then, to the resultant mixture, 201.8 parts of deionized water was added dropwise over a period of about 15 minutes with vigorous stirring to give an emulsion I for cationic electrodeposition having a solid content of 30.0%.

Production Example 7: Emulsion for Cationic Electroclepositable Coating Composition Emulsion II for cationic electrodeposition was prepared by the same formulation and operation as in Production Example 6 except that blocked-polyisocyanate curing agent "a" was replaced with blocked-polyisocyanate curing agent "b" obtained in Production Example 5.

Production Example 8: Emulsion for Cationic Electrodepositable Coating Composition Emulsion III for cationic electrodeposition was prepared by the same formulation and operation as in Production Example 6 except that polyol-modified amino group-containing epoxy resin No. 2 was replaced with polyol-modified amino group-containing epoxy resin No. 3 obtained in Production Example 3.

Production Example 9: Emulsion for Cationic Electrodepositable Coating Composition There were blended and stirred uniformly 87.5 parts of the amino group-containing epoxy resin No. 1, 33.3 parts of the blocked-polyisocyanate curing agent "a" (hexamethylene isocyanate blocked with methylethyl ketoxime), 2.5 parts of LSN-105 (tradename of dibutyltin dibenzoate having a solid content of 40%, manufactured by Sankyo Yuki Gosei Sha) and 8.2 parts of 10% formic acid. Then, to the resultant mixture, 201.8 parts of deionized water was added dropwise over a period of about 15 minutes with vigorous stirring to give an emulsion IV for cationic electrodeposition having a solid content of 30.0%.

Production Example 10: Emulsion for Cationic Electrodepositable Coating Composition Emulsion V for cationic electrodeposition was prepared by the same formulation and operation as in Production Example 9 except that 10 parts of SANNIX PP-1000 (trade name of polyether polyol manufactured by Sanyo Chemical Industrial Ltd.) was added further.

Production Example 11: Pigment-dispersed Paste

To 5.83 parts of a 60% quaternary ammonium salt type epoxy resin, 14.5 parts of titanium white, 0.4 part of carbon black, 7.0 parts of an extender pigment and 2.0 parts of bismuth hydroxide, there was added 2.24 parts of deionized water to give a pigment-dispersed paste having a solid content of 55.0%.

EXAMPLE

Comparative Examples

EXAMPLE 1

To 297 parts of emulsion I for cationic electrodeposition, there were added 49.8 parts of the pigment-dispersed paste and 235.7 parts of deionized water to give a cationically electrodepositable coating composition having a solid content of 20%.

EXAMPLES 2 AND 3 COMPARATIVE EXAMPLES 1 AND 2

The pigment-dispersed paste and deionized water were added in the same manner as in Example 1 to each of the emulsions for cationic electrodeposition II to V in accordance with the formulation which is mentioned in Table 1 below, and, thus, there were obtained cationically electrodepositable coating compositions each having a solid content of 20%.

TABLE 1

|  | Example | | | Comparative Example | |
| --- | --- | --- | --- | --- | --- |
|  | 1 | 2 | 3 | 1 | 2 |
| Emulsion No. (parts) | I | II | III | IV | V |
|  | 297.0 | 297.0 | 297.0 | 297.0 | 297.0 |
| Pigment-dispersed paste (parts) | 49.8 | 49.8 | 49.8 | 49.8 | 49.8 |
| Deionized water (parts) | 235.7 | 235.7 | 235.7 | 235.7 | 235.7 |
| Paint | 20% cationic electrodepositable coating composition | | | | |

Coating Test

A 0.8 mm×150 mm×70 mm zinc-plated steel plate which had been subjected to chemical conversion treatment with Palbond #3020 (trade name of a zinc phosphate treating agent manufactured by Nihon Parkerizing Co., Ltd.) was dipped, to be used as a cathode, in each of the cationically electrodepositable coating compositions obtained in Examples and Comparative Examples described above, and, thus, electrodeposition coating was conducted (coating voltage of rust resistant steel plate: 270 V). Electrodeposited coating films thus formed were baked at 170° C. for 20 minutes by means of an electric hot air dryer. The performance test results of the coated plates thus obtained are shown in the following Table 2.

TABLE 2

|  | Example | | | Comparative Example | |
| --- | --- | --- | --- | --- | --- |
| Coating film performance | 1 | 2 | 3 | 1 | 2 |
| Electrodeposition aptitude of rust resistant steel plate (Note 1) | ○ | ○ | ○ | X | Δ |
| Corrosion resistance (Note 2) | ○ | ○ | ○ | ○ | ○ |
| Impact resistance (Note 3) | 50< | 50< | 50< | 20 | 40 |
| Secondary adhesive property (Note 4) | ○ | ○ | ○ | X | X |
| Bending resistance (Note 5) | ○ | ○ | ○ | X | X |
| Curability (Note 6) | ○ | ○ | ○ | ○ | ○ |

The performance tests were carried out according to the following methods.

(Note 1) Electrodeposition Aptitude of Rust Resistant Steel Plate

A zinc-plated steel plate used as a cathode was dipped in an electrodeposition bath and coated at a voltage of 270 V and a bath temperature of 28° C. to give a test piece, and the number of pin holes in a 10 cm×10 cm test piece was counted, and, thus, the electrodeposition aptitude was evaluated according to the following criteria:

○: no pin holes were observed

Δ: 3 to 5 pin holes were observed x: 10 or more pin holes were observed (Note 2) Corrosion Resistance Electrodeposited coating films of the respective electrodepositably coated plates obtained by baking at a temperature of 170° C. for 20 minutes were given cross-cut, with a knife, to reach substrate, and, then, said plates were subjected to an 840-hour salt water-spraying resistant test according to JIS Z-2371, and, thus, were evaluated by the width of rust and blister from knife cut, according to the following criteria:

○: maximum width of rust and blister is less than 2 mm (one side) from the cut part Δ: maximum width of rust and blister is 2 mm or more and less than 3 mm (one side) from the cut part, and the occurrence of blister is observed on the whole coated surface ×: maximum width of rust and blister is 3 mm or more from the cut part, and the occurrence of blister was observed on the whole coated surface (Note 3) Impact Resistance (Du Pont System)

The test plates obtained by baking at a temperature of 170° C. for 20 minutes were put in a thermo-hygrostat at a temperature of 20±1° C. and a humidity of 75±2% for 24 hours. Then, the test plate was interposed between a pedestal and an impact pin each having a prescribed size which were installed to a Du Pont impact tester with the coated face turned upward. Subsequently, a 500 g weight was dropped onto the impact pin to determine a maximum height which caused neither cracking nor peeling.

(Note 4) Secondary Adhesive Property

TP-37 Grey (trade name of an aminoalkid base intermediate coating material manufactured by Kansai Paint Co., Ltd.) and NEO AMILAC 6000 (trade name of an aminoalkid base top coating material manufactured by Kansai Paint Co., Ltd.) were further coated in order on the coated surface of the coated plate obtained in the coating test described above, and were baked and cured to give a coated plate, which in turn was immersed in warm water of 40° C. for 240 hours, and was then given 2-millimeters square cross-cuts. Subsequently, it was subjected to a peeling test with a cellophane adhesive tape to evaluate a residual rate (residual cross-cuts/100) of the coating film according to the following criteria:

○: 100/100

Δ: 90 to 99/100

×: not more than 89/100

(Note 5) Bending Resistance

The test plate was put in a thermo-hygrostat at a temperature of 20±1° C. and a humidity of 75±2% for 24 hours, and was then bent by 180° in 1 to 2 seconds for the evaluation of both front and back surfaces according to the following criteria:

○: nothing unusual was found on both front and back surfaces

×: something unusual such as cracking and peeling was found on at least one surface (Note 6) Curability The coated surfaces of the respective electrodepositably coated plates obtained by baking at a temperature of 170° C. for 20 minutes were rubbed by about 20 reciprocations in a length of about 3 to 4 cm at a pressure of 0.392 MPa (about 4 kg/cm$^2$) with a set of four gauzes soaked with acetone, and then the coated surface appearance was visually observed for evaluation according to the following criteria:

○: no scratches were observed on the coated surface

Δ: scratches were observed on the coated surface but no base surface was seen

×: coating film was dissolved and base surface was seen

What is claimed is:

1. A cationic resin composition comprising the following components:

(A) an amino group-containing epoxy resin which is prepared by adding an amino group-containing compound (a-2) to an epoxy resin (a-1) having an epoxy equivalent of 400 to 3000, (B) a polyol-modified amino group containing epoxy resin which is prepared by making an epoxy resin (b-1) having an epoxy equivalent of 180 to 2500 react with an amino group-containing compound (b-2) and with a polyol compound (b-3) obtained by adding caprolactone to a compound having plural active hydrogen groups, and (C) a blocked polyisocyanate curing agent, component (A) being 40 to 70% by weight, component (B) being 4 to 40% by weight, and component (C) being 10 to 40% by weight, based on the total solid content of components (A), (B) and (C); and in said amino group-containing epoxy resin (A), the weight ratio of (a-1)/(a-2) being within a range of 90/10 to 60/40; and the resins (A) and (B) being neutralized with an acidic neutralizer.

2. The composition as described in claim 1, wherein the epoxy resin (a-1) is obtained by a reaction between a polyphenol compound and epihalohydrin.

3. The composition as described in claim 2, wherein the polyphenol compound is bisphenol A.

4. The composition as described in claim 1, wherein the epoxy resin (a-1) has an epoxy equivalent falling in a range of 450 to 2500.

5. The composition as described in claim 1, wherein the amino group-containing epoxy resin (A) has an amine value within a range of 40 to 80.

6. The composition as described in claim 1, wherein the epoxy resin (b-1)) is obtained by a reaction between a polyphenol compound and epihalohydrin.

7. The composition as described in claim 6, wherein the polyphenol compound is bisphenol A.

8. The composition as described in claim 1, wherein the epoxy resin (b-1) has an epoxy equivalent falling in a range of 200 to 2000.

9. The composition as described in claim 1, wherein the active hydrogen groups in the compound having plural active hydrogen groups are selected from the group consisting of alcoholic hydroxyl group, primary amino group and secondary amino group.

10. The composition as described in claim 1, wherein the compound having plural active hydrogen groups is selected from the group consisting of low molecular weight polyols, linear or branched polyetherpolyols, linear or branched polyesterpolyols, amine compounds having a primary amino group and/or a secondary amino group and hydroxylamine compounds having a primary amino group and/or a secondary amino group in combination with a hydroxyl group.

11. The composition as described in claim 1, wherein the compound having plural active hydrogen groups has a number average molecular weight falling in a range of 62 to 5000.

12. The composition as described in claim 1, wherein the compound having plural active hydrogen groups has, on average, at least two and less than 30 active hydrogen groups per molecule.

13. The composition as described in claim 1, wherein the compound having plural active hydrogen groups is selected from the group consisting of ethylene glycol, propylene glycol, 1,4-butanediol, 1,6-hexanediol, diethylene glycol, hydrogenated bisphenol A, glycerin, trimethylolethane, trimethylolpropane, pentaerythritol, dipentaerythritol, polyethylene glycol, polypropylene glycol, polytetramethylene glycol, poly(ethylene•propylene) glycol, bisphenol A ethylene glycol ether, bisphenol A propylene glycol ether, butylenediamine, hexamethylenediamine, monoethanolamine, diethanolamine, triethanolamine, isophoronediamine, ethylenediamine, propylenediamine, diethylenetriamine and triethylenetetramine.

14. The composition as described in claim 1, wherein caprolactone is ε-caprolactone.

15. The composition as described in claim 1, wherein the molar amount of caprolactone added to the compound having plural active hydrogen groups falls in a range of 1 to 30 moles per equivalent of the active hydrogen group.

16. The composition as described in claim 1, wherein the polyol-modified amino group-containing epoxy resin (B) is obtained by making amino group-containing compound (b-2) and polyol compound (b-3) react, at the same time, with epoxy resin (b-1).

17. The composition as described in claim 1, wherein the polyol-modified amino group-containing epoxy resin (B) is prepared by a reaction of 60 to 90% by weight of the epoxy resin (b-1), 5 to 25% by weight of the amino group-containing compound (b-2) and 5 to 30% by weight of the polyol compound (b-3), each based on the total weight of solid contents of the epoxy resin (b-1), the amino group-containing compound (b-2) and the polyol compound (b-3).

18. The composition as described in claim 1, wherein the polyol-modified amino group-containing epoxy resin is prepared by a reaction of 62 to 85% by weight of the epoxy resin (b-1), 6 to 19% by weight of the amino group-containing compound (b-2) and 5 to 20% by weight of the polyol compound (b-3), each based on the total weight of solid contents of the epoxy resin (b-1), the amino group-containing compound (b-2) and the polyol compound (b-3).

19. The composition as described in claim 1 which comprises 43 to 67% by weight of component (A), 7 to 37% by weight of component (B) and 15 to 40% by weight of component (C), based on the total solid contents of components (A), (B) and (C).

20. The composition as described in claim 1 which further comprises a bismuth compound as a rust preventive.

21. A cationic electrodeposition bath which comprises the cationic resin composition as described in claim 1.

22. A cationic electrodeposition-coating method which comprises using the cationic resin composition as described in claim 1 in cationic electrodeposition-coating.

23. An article which has been coated with use of the cationic resin composition as described in claim 1.

* * * * *